United States Patent Office 2,789,910
Patented Apr. 23, 1957

2,789,910

PROCESS FOR THE PREPARATION OF STERILE BUTTER

Marc Vermeulen, Etterbeek, Belgium

No Drawing. Application June 15, 1953,
Serial No. 361,813

Claims priority, application Belgium June 17, 1952

2 Claims. (Cl. 99—119)

This invention relates to a process for the preparation of sterile butter and also to the sterile butter obtained by such a process.

As known, butter is prepared from milk cream containing about 15–25% by weight of fatty materials. This milk cream, which constitutes a fat-in-water type emulsion, is progressively concentrated until the amount of fatty materials reaches at least 80% by weight. In order to obtain high grade butter, the proteinic envelopes of the fat cells have suitably to be broken or solubilized. This rupture or solubilizing affords a closer contact between the fat cells, so as to obtain butter having substantially an uniform texture.

The problem of the conservation of butter is, as known, very important, because butter is available in great quantities during certain periods of time (high lactation periods), while it becomes scarce during other periods. The conserving methods heretofore employed are expensive. On the other hand, when butter is heated at high temperatures, it melts and, after subsequent cooling, its original texture is lost. Moreover, butter contains thermolabile substances, such as lactose and albumen. At the sterilizing temperatures, these substances are damaged and give to the butter a disagreeable taste and appearance.

This invention has for an object a process for the preparation of sterile butter, whereby the abovementioned disadvantages may be prevented. The butter obtained by this process has a long conservation capacity, if it is maintained in such conditions as to prevent its reinfection or its oxidation. For this purpose, the butter is conserved in sealed cans or similar containers.

According to an essential feature of the invention, the most part of the thermolabile substances, such as lactose and albumen, contained in the starting milk cream, is removed by soaking the milk cream with water, in which said thermolabile substances are soluble, this cream being substantially concentrated until it contains at least 80% by weight of fatty materials and finally sterilized, by heating in the absence of air at a sterilizing temperature of more than 100° C. and preferably at about 117° C.

The soaking of the cream, in order to remove the thermolabile substances, is conveniently carried out with a volume of water corresponding to 2–5 times the volume of the cream to be treated. The abovementioned thermolabile substances, which are soluble in water, are substantially dissolved in the aqueous phase and are removed, when the cream is subsequently concentrated, for example by centrifuging the mixture of cream and water.

In order to remove quantitatively said thermolabile substances and in order to give simultaneously an agreeable aroma to the butter, after being soaked with water and concentrated, the milk cream is seeded with a bacterial culture, for example of *Streptococcus lactis* or *Micrococcus cremoris*. As a result of this seeding, the acidity of the cream is slightly increased, while the cream becomes rather highly aromatized, this seeding giving rise to the formation of an amount of diacetyl, which may reach 50 mg. per liter of cream.

In view of this high aromatization and low acidification of the cream, the latter is seeded, according to the invention, with a bacterial culture, which has been adapted to a growing temperature between about 18 and 35° C. Practical tests have shown, when using bacterial cultures adapted to a temperature of 15° C., that the formation of diacetyl is low, while the acidification is considerable. In other words, the use of the latter bacterial cultures gives rise to substantial acidification, at the expense of the formation of aroma. The seeded cream is preferably maintained at a temperature of about 30–35° C., until the acidity no longer increases. At this time, the cream has a pH of about 5. Other details and features of the invention will appear from the following detailed description of one mode of carrying out the process according to the invention.

EXAMPLE

1. *Preparation of a bacterial culture for the seeding of milk cream.*—2.5 liters of purified fresh milk, which has been pasteurized and skimmed, are sterilized, by heating, during 30 minutes, in a container supplied with live steam, and subsequently cooled at a temperature of 34° C. The resulting skim milk has an acidity of 6°4 Soxhlet (SH). This skim milk is then seeded with a culture of *Streptococcus lactis* having an acidity of 36°5 SH. The seeded medium is placed in an incubator at 32–34° C. Immediately after the seeding, the acidity increases to 9°4 SH. Five hours after the seeding, the acidity reaches 23° SH. The medium is then allowed to cool and is kept in a refrigerator until it is used.

2. *Preparation of sterile butter.*—500 liters of milk cream are prepared from milk, which is purified, i. e. filtered, skimmed and heated at 95° C. After cooling to 14° C., the milk cream, which contains 26.5% by weight of fatty materials and has an acidity of 4°2 SH, is soaked with 1000 liters of water. After mixing the cream with said water during 1½ hours, the soaked cream is centrifuged at 15° C. The resulting centrifuged cream contains 30.5% by weight of fatty materials, while its acidity has decreased to 1° SH.

The milk cream is subsequently heated on a water bath at 34° C. and seeded with 0.5% of the bacterial culture, prepared as described hereinbefore. At the moment of the seeding, the acidity of the culture is 26°8 SH.

Immediately after the seeding, the acidity of the milk cream increases to 1°2 SH. The acidity is then allowed to rise, while the seeded cream is maintained at a temperature of 32°5–34° C. Every other hour, the cream is slightly shaken, in order to avoid the formation of an oily surface layer.

The acidity of the cream varies in the manner shown in the following table:

| Time in hours after seeding | Acidity, degrees SH |
|---|---|
| 3 | 1°5 |
| 6 | 3°1 |
| 9 | 7° |
| 12.5 | 7°9 |
| 14 | 8°4 |
| 15 | 8°5 |
| 16 | 8°6 |
| 17 | 8°6 |

As shown in this table, a stabilization of the acidity occurs during the two last hours. This means that the acidification is terminated, so that the lactose and the albumen are substantially removed from the cream.

When the stability of the acidity is determined, the cream is cooled to 15° C. The pH of the cream is then 5.05.

After the addition of a solution of salt, if salt butter is to be prepared, the cream is heated to 85° C. and centrifuged. After centrifuging, the cream contains 84% by weight of fatty materials. The concentrated cream is immediately poured into cans, avoiding the cooling of the cream, and the sealed cans are placed in a water bath heated at 95° C. When all the cans are sealed, they are removed from the water bath and placed in a sterilizer previously heated at 90° C. The temperature of the sterilizer is then increased to 117° C. and maintained during half an hour at this sterilizing temperature. The hot water contained in the sterilizer is then replaced by cool water. When the temperature of the water contained in the sterilizer reaches 30° C., the cans are removed from the sterilizer and are allowed to cool down to normal temperature, preferably 20° C.

The resulting butter is perfectly sterile, has an excellent texture and is finely aromatized.

It is understood that the invention is not limited to the details described hereinbefore and that various modifications may be made to these details, within the scope of the invention described in the following claims.

What I claim is:

1. A process for the preparation of sterile butter from milk cream, which comprises the steps of removing the greater part of the thermolabile substances from the starting milk cream by extracting the latter with a volume of water corresponding to 2 to 5 times the volume of the cream, centrifuging the extracted cream so as to remove the water containing the greater part of the thermolabile substances, removing the rest of the thermolabile substances from the centrifuged cream by seeding the latter with a bacterial culture selected from the group comprising *Streptococcus lactis* and *Micrococcus cremoris* and adapted to a growing temperature between about 18 and 35° C., maintaining the seeded cream at a temperature between about 30 and 35° C. as long as the acidity of the cream increases, again centrifuging the cream and then concentrating the latter, pouring the concentrated cream into air-tight and heat-resistant containers, sealing the latter and then heating the same and the cream contained therein to a sterilizing temperature.

2. A process for the preparation of sterile butter from milk cream, which comprises the steps of removing the greater part of the thermolabile substances from the starting milk cream by extracting the latter with a volume of water corresponding to 2 to 5 times the volume of the cream, centrifuging the extracted cream to remove the water containing the greater part of the thermolabile substances, heating the centrifuged cream to a temperature between 30 and 35° C., removing the rest of the thermolabile substances from the centrifuged cream by seeding the latter with a bacterial culture selected from the group comprising *Streptococcus lactis* and *Micrococcus cremoris* and adapted to a growing temperature between about 18 and 35° C., maintaining the seeded cream at a temperature between about 30 and 35° C. as long as the acidity of the cream increases, then heating the cream to about 85° C., centrifuging the thus-heated cream and pouring it into air-tight and heat-resistant containers, sealing the said containers and heating the latter and the cream contained therein to a temperature above 100° C. for about 30 minutes, and finally cooling the said containers and cream contained therein down to a temperature of about 20° C.

References Cited in the file of this patent

UNITED STATES PATENTS

| | | |
|---|---|---|
| 644,624 | Muller | Mar. 6, 1900 |
| 1,014,574 | Lisle | Jan. 9, 1912 |
| 1,509,084 | North | Sept. 16, 1924 |
| 2,168,376 | Van der Meulen | Aug. 8, 1939 |
| 2,196,239 | Werkman | Apr. 9, 1940 |
| 2,414,837 | Riggs | Jan. 28, 1947 |

OTHER REFERENCES

Hunziker: "Butter Industry," pp. 338, 339, 348–352, 1940.

Fouts et al.: "Dairy Manufacturing Processes," 1948, pp. 180–183.